(12) United States Patent
Wight

(10) Patent No.: US 8,291,123 B2
(45) Date of Patent: Oct. 16, 2012

(54) SYSTEM FOR SHARING HUMAN-COMPUTER INTERFACE OF A LEGACY DEVICE WITH EXPANSION UNITS

(75) Inventor: Bruce A. Wight, Fort Wayne, IN (US)

(73) Assignee: Exelis Inc., McLean, VA (US)

( * ) Notice: Subject to any disclaimer, the term of this patent is extended or adjusted under 35 U.S.C. 154(b) by 186 days.

(21) Appl. No.: 11/859,826

(22) Filed: Sep. 24, 2007

(65) Prior Publication Data

US 2008/0077714 A1    Mar. 27, 2008

Related U.S. Application Data

(60) Provisional application No. 60/846,364, filed on Sep. 22, 2006.

(51) Int. Cl.
*G06F 3/00* (2006.01)
(52) U.S. Cl. .......................................................... 710/3
(58) Field of Classification Search ........................ 710/3
See application file for complete search history.

(56) References Cited

U.S. PATENT DOCUMENTS

| | | | | |
|---|---|---|---|---|
| 5,151,972 A | * | 9/1992 | Lorenz et al. | 379/100.16 |
| 5,367,679 A | * | 11/1994 | Khaira | 718/103 |
| 5,436,676 A | * | 7/1995 | Pint et al. | 348/734 |
| 6,189,050 B1 | * | 2/2001 | Sakarda | 710/18 |
| 6,904,530 B2 | * | 6/2005 | Frank | 713/300 |
| 7,546,396 B2 | * | 6/2009 | Weisser et al. | 710/36 |
| 2003/0215102 A1 | * | 11/2003 | Marlowe | 381/77 |

OTHER PUBLICATIONS

Thesis: A Software-Based Network Infrastructure for Mobile AD HOC Networking in support of Small Tactical Units using the SINCGARS Radio; by Steven R. Brand Public Release Date Mar. 2006.*
Studen Guide: 25U10 Signal Support Procedures for SINCGARS Date Oct. 1, 2004.*

* cited by examiner

*Primary Examiner* — Henry Tsai
*Assistant Examiner* — Eric Oberly
(74) *Attorney, Agent, or Firm* — Edell, Shapiro & Finnan, LLC

(57) ABSTRACT

A system for sharing a human-computer interface between a legacy device and an expansion unit for supplementing operation of the legacy device includes a logic device configured to selectively route input and output signals between the human-computer interface and the legacy device or the expansion unit. The expansion unit monitors input signals from the human-computer interface for control codes designating usage of the human-computer interface by either the expansion unit or the legacy device. The logic device includes a switching device that selectively decouples inputs from the human-computer interface from the legacy device during usage of the interface by the expansion unit to isolate the legacy device from input signals not intended for the legacy device.

22 Claims, 3 Drawing Sheets

SYSTEM FOR SHARING HUMAN-COMPUTER INTERFACE OF A LEGACY DEVICE WITH EXPANSION UNITS

CROSS REFERENCE TO RELATED APPLICATIONS

This application claims priority under 35 U.S.C. §119(e) from U.S. Provisional Patent Application Ser. No. 60/846,364, filed Sep. 22, 2006, and entitled "Expansion Module for Enhancing Operation of a Legacy Communication Device," the entire contents of which are hereby incorporated by reference.

BACKGROUND

Integrated Human-Computer Interfaces (HCI) provided as part of legacy systems manage a wide variety of equipment. The HCI units are tied to the internal hardware and software of the managed equipment and provided a dedicated mechanism for local control as well as immediate response to security or safety alerts.

A legacy or existing device designed to operate in a particular manner subsequently may be required to additionally support new equipment or modules that augment or enhance the original legacy device. For example, legacy communication equipment lacking some of the capabilities of future software defined radios or radios conforming to the U.S. Government's Software Communication Architecture, can be greatly enhanced by attaching a separate expansion unit which is compatible with the legacy equipment and which provides many of the more advanced capabilities and flexibility of a software defined radio. Preferably, such an expansion unit would connect to an existing or legacy communication device in such a manner that the unit provides additional capabilities to the existing device without the need for wholesale removal and exchange of the existing legacy device with a new device. To make retrofitting of legacy equipment cost effective, it is desirable to minimize modifications to the original equipment, including the human-computer interface. If the expansion unit does not include a full HCI capability, consideration must be made as to how to share the HCI of the legacy device with the expansion unit.

However, conventional integrated HCI devices are tightly coupled with the hardware and embedded software of the controlled legacy device and are not typically accessible via other external interfaces for use with expansion units or devices. Using the integrated HCI to provide access to expansion units would conventionally require software changes to the legacy unit which are expensive, hard to validate, and difficult to update on fielded systems. Moreover, the use of shared HCIs can result in critical message updates being missed when the HCI is not available to the legacy device (i.e., during use by an expansion unit).

Accordingly, there remains a need for a more effective approach to sharing an integrated human-computer interface of a legacy device with expansion units, which minimizes the hardware and software modifications required in the legacy device and avoids malfunction or disruption of operation of the legacy device.

SUMMARY

According to the present invention, usage of a human-computer interface of a legacy device is shared between the legacy device and at least one expansion unit for supplementing operation of the legacy device. A logic device is responsible for selectively routing input and output signals to effect the sharing of the human-computer interface. The expansion unit monitors input signals from the human-computer interface for control codes designating usage of the human-computer interface.

Under default operating conditions, the legacy device uses the human-computer interface in the same manner it would use the interface in the absence of any expansion unit, and sends and receives signals routed through the logic device. When the expansion unit receives a control code designating usage of the human-computer interface by the expansion unit, the logic device is instructed to couple the human-computer interface to the output of the expansion unit and to decouple the legacy device from the input signals from the human-computer interface. In this manner, control and usage of the human-computer interface is switched to the expansion unit.

Conversely, in response to the expansion unit receiving a control code designating usage of the human-computer interface by the legacy device, the logic device is controlled to couple the legacy device to input signals from the human-computer interface and to decouple the human-computer interface from the output of the expansion unit, thereby reverting usage and control of the human-computer interface to the legacy device.

By placing responsibility for managing the sharing of the human-computer interface with the logic device and expansion unit, retrofitting of the legacy device to accommodate an expansion unit can be accomplished with minimal modification to the legacy device. The software used to operate the legacy device need not be modified, and the set of commands and controls used to operate the legacy device remain the same. Since operation of the legacy device is essentially unaffected by the sharing of the interface, the legacy device can remain essentially "unaware" that one or more expansion units is sharing its human-computer interface.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

Figure 1:
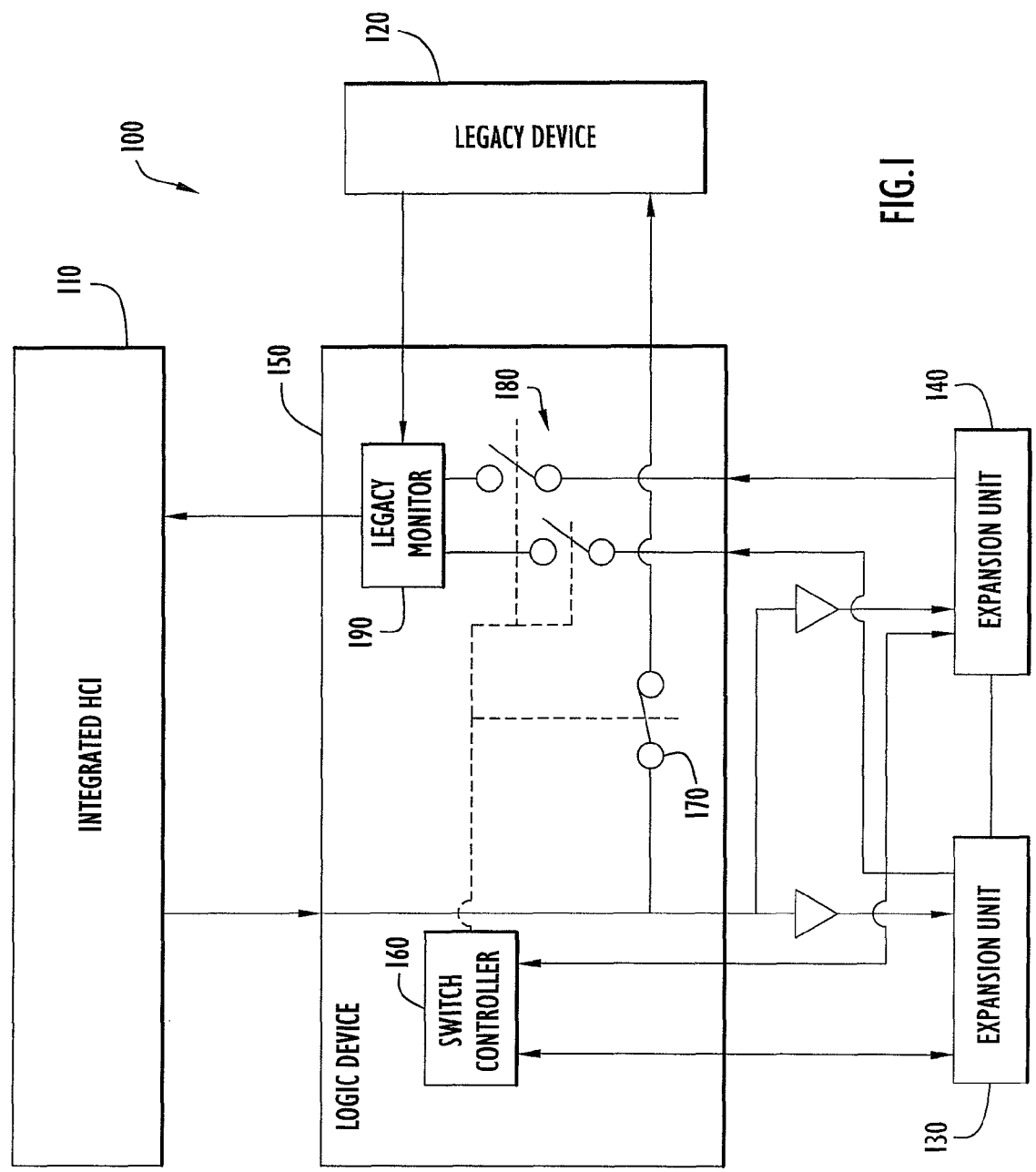
FIG. 1 is a functional block diagram illustrating a system for sharing a human-computer interface between a legacy device and a plurality of expansion modules in accordance with an exemplary embodiment of the present invention.

The invention provides a method and system for sharing a common physical human-computer interface (HCI) between legacy components and future system components. FIG. 1 is a block diagram which functionally illustrates a system 100 for sharing a human-computer interface (HCI) in accordance with an exemplary embodiment of the present invention. System 100 includes an HCI 110, which can be an integrated component of a legacy device 120. For example, HCI 110 can be located on an exterior surface of legacy device 120. Alternatively, HCI 110 can be a separate module or separable from legacy device 120. In either case, however, the HCI is principally designed and configured to support human interaction with the legacy device.

The HCI can include any of a variety of mechanisms for supplying signals from a human user to an electronic device and for supply signals from an electronic device to a human user. For example, the HCI can include an input device such as a keypad or keyboard for entering alphanumeric characters or character strings. The keypad can include function keys that are dedicated to entering specific commands or control signals to instruct the supported equipment to perform a certain operation, operate in a specific manner, or to configure the device. Certain keys may have multiple or alternative functions which can be activated by combining pressing of the key with other keys in sequence or simultaneously (e.g., like the use of an "alt" key on a keyboard or calculator).

The HCI can include an output device such as a display which shows information about the state or mode of the equipment or software, text messages, video signals, or output data such as readings or measurement results. The HCI of the invention is not limited to any particular input and output devices. Thus, for example, the HCI may include a touch screen display, audio input and output, video input and output, cursor control mechanisms (e.g., a mouse, a rotating ball, or a touch-sensitive pad), a menu-driven display system, etc.

Within the context of the term human-computer interface, the term "computer" is used in a very general sense to refer to any electronic equipment with some data or signal processing capability which can process input signals received from an interface with a user and/or supply output signals to an interface with a user. Thus, for example, the HCI of the present invention is not limited to interacting with equipment that would be considered a "computer" per se but rather any equipment that processes signals and requires some interaction with a human user. Further, as used herein, the terms input signal(s) and output signal(s) refer to any type of signals that would be suitable to send to or receive from such equipment, including but not limited to keypad, mouse click, or touch screen entries, data, audio signals, video signals, command or control codes, text information, warning or error messages, status information, measurement results, equipment configuration instructions, tactical information, GPS or navigation related information, etc.

In the exemplary embodiment shown in FIG. 1, the legacy device is augmented with two expansion units 130 and 140 which share use of the HCI with the legacy device. The invention is not limited to any particular number of expansion units that can be used and may involve one or any practical number of expansion units. The expansion units are generally designed to enhance operation of a legacy device designed and built at an earlier time. The use of such expansion units can often be more cost effective than completely replacing a significant number of legacy devices in operation.

Figure 2:
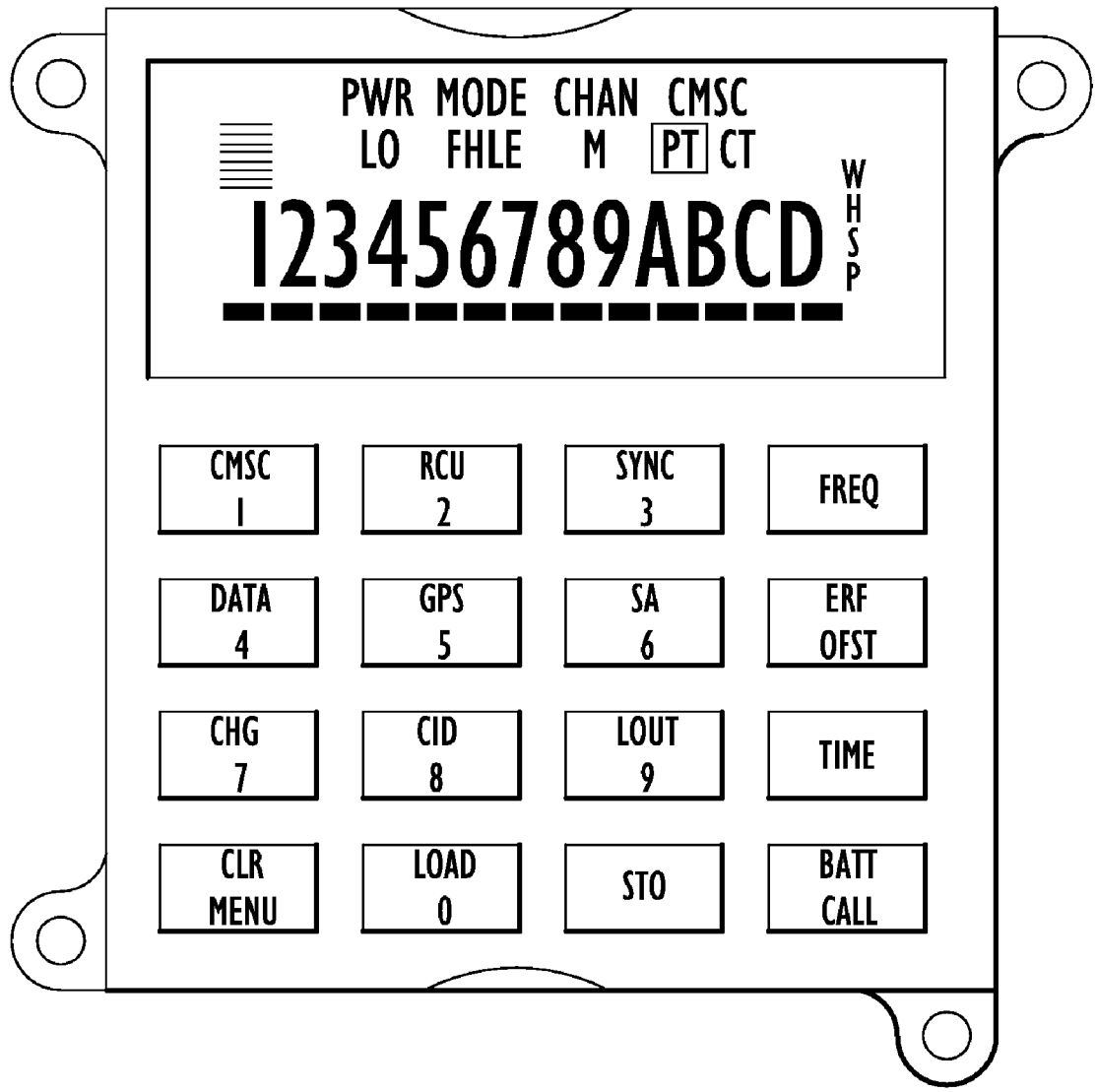
FIG. 2 is a diagram of a human-computer interface in accordance with an exemplary embodiment of the present invention.

One specific example of a system with a shared human-computer interface involves a legacy radio (e.g., a two way communication device) with an expansion unit that includes a transmitter/receiver that operates in different modes from the legacy radio. The legacy radio could include hardware which runs on one waveform set and which is programmable, but is not a software defined radio. The expansion radio, on the other hand, could be a more highly configurable software defined radio that employs reprogrammable field programmable gate arrays (FPGAs) that can generate a much wider range of waveforms and operate at more or different frequency bands, thereby increasing the flexibility and capability of the legacy radio. The expansion unit can be suitably configured to mechanically and electrically connect with the legacy device so as to facilitate electrical connection and/or communication between the expansion unit and the legacy equipment and enhanced performance and operability of the legacy device. The HCI of the legacy radio is physically unchanged, such that the same keys access the same functions of the legacy radio prior to the retrofit. The expansion radio shares the integrated HCI of the legacy device. An example of an HCI comprising a display and keypad suitable for such a legacy radio is shown in FIG. 2.

In general, for a cost-effective retrofit, it may be desirable to design the expansion units without their own dedicated HCI and have the expansion units share the integrated HCI of the legacy device. Thus, while the expansion units may possess inputs and outputs for certain types of signals, the expansion units generally do not possess an HCI suitable for providing control signals or commands from a user to the expansion units or for displaying output information from the expansion units.

Referring again to FIG. 1, HCI 110 is coupled to legacy device 120 and to expansion units 130 and 140 by a logic device 150. Logic device 150 includes a switch controller 160, which controls an input switch 170 and output switches 180 (each output switch corresponds to one of the expansion units), and a legacy monitor 190. Logic device 150 can be embodied as a circuit card assembly for insertion into the legacy device chassis, for example. Expansion modules 130 and 140 and/or logic device 150 may include signal buffers, multiplex devices and logic devices (field programmable or ASIC devices) to monitor and control the flow of HCI communications, as described below. More generally, logic device 150 can be implemented using any suitable combination of hardware and software. As used herein, the term "logic device" is used in a general sense to refer to any single device or combination of devices implemented in any combination of hardware and software which perform the functions described herein. Thus, for example, the logic device need not be embodied on a single card or within a single module or chip, and the functions of the logic device may be distributed within the system according to any suitable architecture.

Input signals from HCI 110 are supplied to logic device 150 via an input link, and output signals from expansion units 130 and 140 and legacy device 120 are supplied by logic device 150 to HCI 110 via an output link. The input and output links can be any type of physical communication link including electrical wires, optical fiber, and wireless, and can be configured in any format or protocol, e.g., a bus architecture, serial signals, parallel signals, Ethernet, etc. Logic device 150 is primarily responsible for selectively routing input and output signals from and to the HCI to switch control and use of the HCI among the expansion units and the legacy device.

As shown in FIG. 1, logic device 150 includes an input signal path from the input link to inputs of the expansion units, and this input signal path is not interruptible with a switching device. The input signal path is coupled to the input of logic device 120 via input switch 170. Logic device 150 also includes an output signal path which selectively supplies output signals from legacy device 120 and expansion unit 130 and 140 to the output link. Legacy monitor 190 lies along the output signal path and screens output signals from legacy device 120 as described below. Upon being closed, each output switch 180 respectively couples one of the expansion units 130 and 140 to legacy monitor 190 and hence to the output signal path.

Operation of the system shown in FIG. 1 for sharing the HCI is described as follows. Logic device 110 essentially intercepts input signals from HCI 110 on the input link and routes the input signals to expansion units 130 and 140. These signals would have been directly routed to legacy device 120 before augmentation of the legacy device. As shown in FIG. 1, under default operating conditions, legacy device 120 uses HCI 110 in its original manner and thus input switch 170 is closed to allow input signals from HCI 110 to reach legacy device 120. Likewise, legacy monitor 190 passes all output signals from legacy device 120 to the output link to HCI 110. Thus, in the event no expansion unit is installed, default operation permits the legacy device to operate in its original manner, using the HCI device exclusively.

Input signals from HCI 110 are continuously monitored by expansion units 130 and 140 for a pre-determined control code requesting or designating that an expansion unit take control of use of HCI 110. The control code can be, for example, a sequence of keypad signals entered by the user in series, parallel, or a combination of both. Each expansion unit has a different control code, such that each of the expansion units can independently be designated for taking control of use of HCI 110 as required by the user. Preferably, the control code for designating an expansion unit is an entry that is not recognized by legacy device 120. That is, the control code does not correspond to any command or control signal known to legacy device 120, such that receipt of the control code by the legacy device does not result in any change or adverse effect to operation of legacy device 120. Thus any key press or sequence that means nothing to legacy device 120 can be used as a control code to control logic device 150 to switch control of HCI 110 to one of the expansion units 130 and 140.

Upon an expansion unit's receipt of the control code designating it to use HCI 110, the expansion unit directs logic device 150 via switch controller 160 to open input switch 170 to disconnect legacy device 120 from the input signal path, thereby preventing input signals from HCI from reaching legacy device 120 during use by the expansion unit. This allows the user to operate HCI 110 by entering input sequences intended for the designated expansion unit without those input sequences impacting operation of the legacy device. Thus, legacy device 120 is effectively isolated from HCI input signals. The designated expansion unit also directs switch controller 160 to close the corresponding output switch 180 at this time to connect the output signal path to the expansion unit. In this manner, output signals from the designated expansion unit are routed via the output link to HCI 110 for display or the like. The output switches corresponding to other, non-designated expansion units remain open such that the other expansion units are not using HCI 110.

Note that expansion units 130 and 140 continue to monitor the HCI input signal for control codes regardless of whether the legacy device or one of the expansion units is currently using and controlling the HCI. In this manner, for example, if one expansion unit is controlling the HCI and another expansion unit receives its HCI control code, the newly designated expansion unit can instruct the switch controller to close the corresponding output switch to connect the HCI output link to the newly designated expansion unit and to open all other output switches. Switch controller 160 can then notify the previously designated expansion unit that control of the HCI has been switched to a different expansion unit.

In a similar manner, a control code can be entered via HCI 110 which reverts control of HCI 110 back to legacy device 120. The expansion unit currently using HCI 110 monitors the input signals for the legacy device control code. By way of example, this control code can consist of continuously holding down one of the keys for two seconds (recall that legacy device 120 is not receiving input signals from HCI 110 at this time and so is not sensitive to the key sequence). Upon receipt of the appropriate legacy device control code from HCI 110, the expansion unit instructs switch controller to close input switch 170 to connect the input signal path to legacy device 120 and to open the currently closed output switch 180 to disconnect the output signal path to HCI 110 from the expansion unit. In this manner, control and use of HCI 110 reverts back to legacy device 120.

While legacy device 120 controls HCI 110, legacy monitor 190 simply passes output signals from legacy device 120 to the output signal path connected to the output link to HCI 110. However, when one of the expansion units is using HCI 110, legacy monitor 190 monitors the legacy device output signals for certain control sequences. In general, routine or expected sequences are blocked when an expansion unit has control of the HCI. However, legacy monitor 190 can detect critical legacy display sequences (e.g., a fault condition) that will automatically cause the reversion of control of HCI 110 to legacy device 120. When this reversion occurs, logic device 150 opens all output switches 180, closes input switch 170, and notifies the expansion units that control is reverting to legacy device 120 to allow for proper continued operations. As shown in FIG. 1, the expansion unit or units are always connected to the HCI device. The legacy device, on the other hand, is selectively connected to the HCI device depending on the current operating state of the logic device.

The approach to sharing the legacy device's HCI described herein allows expansion units to temporarily use and control the HCI without impacting legacy software components or requiring redesign thereof. The system for sharing an HCI according to the present invention isolates the effects of the shared HCI interface from impacting the legacy device and software in a number of ways. A logic device is used to control and route the HCI input and output signals. Using the expansion unit(s) to control the logic device routing and use of the HCI, flexible sharing of the HCI between expansion units is possible. This approach also isolates the legacy hardware and software components from the control sequences used by the expansion units. Nevertheless, the legacy device retains access to the HCI for priority display updates.

Figure 3:
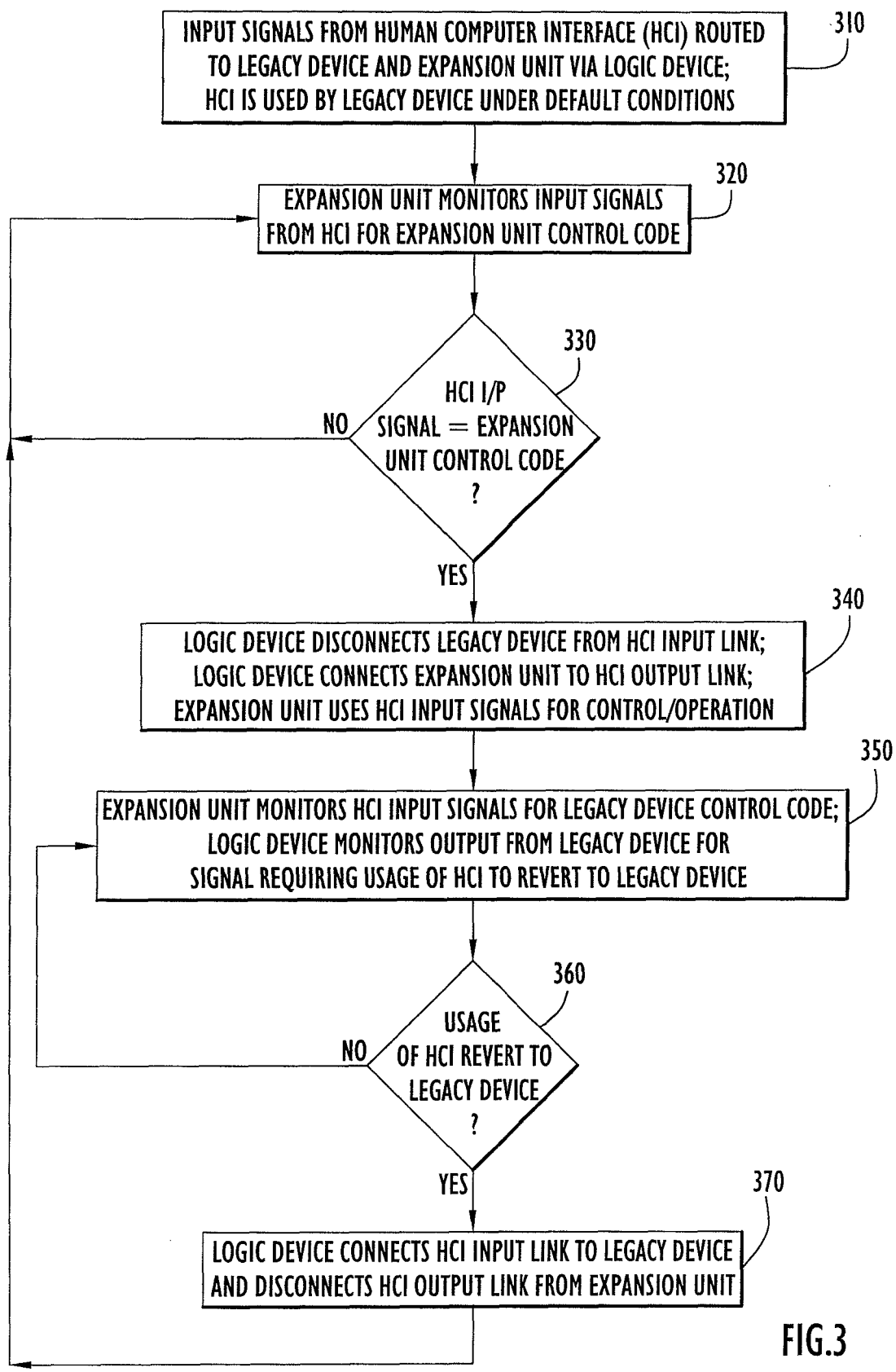
FIG. 3 is a flow chart illustrating operation of a system for sharing a human-computer interface in accordance with an exemplary embodiment of the present invention.

The methodology of sharing a human-computer interface between a legacy device and an expansion unit according to an exemplary embodiment of the invention is summarized in the flow chart of FIG. 3. In operation 310, under default operating conditions, the legacy device uses the HCI in essentially the same manner it would in the absence of any expansion unit (i.e., operation would be the same as before the equipment was augmented to accommodate an expansion unit, although input and output signals between the HCI and the legacy device are routed through the logic device). The logic device also routes input signals from the HCI to the expansion unit.

In operation 320, the expansion unit monitors the input signals from the HCI for a control code designating usage of the HCI. In this case, if the HCI is currently being used by the legacy device, the expansion unit is monitoring the input signals for a control code which designates usage of the HCI by the expansion unit, i.e., an expansion unit control code.

At decision point 330, if the input signal from the HCI is the control code for designating usage of the HCI by the expansion module, flow proceeds to operation 340 in which the logic device disconnects the legacy device from the HCI input link and connects the expansion unit output to the HCI output link, such that the expansion unit can use subsequent HCI input signals for control, operation, configuration, etc. Otherwise, the expansion unit continues to monitor the input signals from the HCI, as shown in operation 320.

After operation 340 in the flow diagram of FIG. 3, the logic device is configured such that the HCI is being used by the expansion unit. While the expansion unit is using the HCI, in operation 350, the expansion unit monitors the input signals from the HCI for a control code designating usage of the HCI by the legacy device (i.e., the legacy device control code). Meanwhile, the legacy monitor of the logic device monitors output signals from the legacy device for any signal that may require usage of the HCI to revert to the legacy device. At decision point 360, if either the expansion unit detects the legacy device control code or the legacy monitor detects a legacy device output signal requiring usage of the HCI to revert to the legacy device, flow proceeds to operation 370, in which the logic device connects the HCI input link to the input of the legacy device and disconnects the HCI output link from the output of the expansion unit to revert usage/control of the HCI back to the legacy device. Flow then returns to operation 320, where the expansion unit continues to monitor the input signals from the HCI for the expansion unit control code.

If, at decision point 360, usage of the HCI is not required to revert to the legacy device, flow returns to operation 350 where the expansion unit continues to monitor the input signals from the HCI for the legacy device control code and the legacy monitor of the logic device continues to monitor the output of the legacy device.

The system for sharing an HCI described herein can be incorporated into virtually any electronic device, equipment, or assembly of systems or subsystems in which an HCI is shared among a number of components requiring interaction with a user, and is particularly useful in the context of a legacy or existing device having an HCI, where the legacy device is being updated or supplemented with an additional module, unit, equipment, or device that could benefit from sharing the HCI of the legacy device. The approach of the invention minimizes redesign and modification of the existing device's hardware and software, thereby making integration of the expansion device more reliable and cost efficient.

By way of example, the system for sharing an HCI can be implemented in a communication device capable of transmitting and/or receiving signals, including but not limited to: a fixed-position or mobile RF transmitter, a handheld or body-mounted radio; any type of wireless telephone (e.g., analog cellular, digital cellular, or satellite-based); a pager or beeper device; a PDA; a radio carried on, built into or embedded in a ground-based or airborne vehicle; any electronic device equipped with wireless transmission capabilities, including multimedia terminals capable of transmitting audio, video and data information; devices used in ground-based, airborne and/or space-based navigation (e.g., GPS-related devices); radar devices; and devices capable of performing communication and navigation operations. The shared HCI system of the present invention can also be incorporated into other types of equipment having two or more modules or components that require interaction with a human user, including electronic toys, computer equipment, and automotive and avionic electronics. The foregoing list of examples is not intended to be exhaustive but merely exemplary of the type of equipment and devices that can employ the shared HCI system of the invention.

Having described exemplary embodiments of a system for sharing a human-computer interface, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for sharing a human-computer interface of a legacy device, the human-computer interface allowing a user to enter signals and to supply signals to the user, the system comprising:
    an expansion radio configured to receive control codes entered via the human-computer interface, the expansion radio comprising a transmitter and a receiver; and
    a logic device configured to receive input signals from the human-computer interface via an input link and to supply output signals to the human-computer interface via an output link, the logic device providing shared usage of the human-computer interface between the legacy device and the expansion radio by selective routing of input and output signals, wherein the logic device is configured to couple the input link to the expansion radio during operation to continuously supply the input signals to the expansion radio;
    wherein the expansion radio is configured to continuously monitor the input signals for control codes designating usage of the human-computer interface and to control an operating state of the logic device in response to control codes from the human computer interface, such that:
    the expansion radio is configured to control the logic device to couple the expansion radio to the output link and decouple the legacy device from the input link in response to the expansion radio receiving a control code designating usage of the human-computer interface by the expansion radio; and
    the expansion radio is configured to control the logic device to couple the legacy device to the input link and decouple the expansion radio from the output link in response to the expansion radio receiving a control code designating usage of the human-computer interface by the legacy device.

2. The system of claim 1, wherein the control code designating usage of the human-computer interface by the expansion radio comprises an input signal not recognized by the legacy device.

3. The system of claim 1, wherein the expansion radio lacks a human-computer interface suitable for supplying control signals to the expansion radio.

4. The system of claim 1, wherein the expansion radio is one of a plurality of expansion radios coupled to the input link via the logic device, wherein each of the expansion radios monitors the input signals for a respective control code designating usage of the human-computer interface by the respective expansion radio.

5. The system of claim 1, wherein the logic device further comprises:
    an input switch configured to selectively connect the input link to the legacy device;
    an output switch configured to selectively connect the output link to the expansion radio; and
    a switch control configured to control states of the input switch and the output switch in response to commands from the expansion radio.

6. The system of claim 1, wherein the logic device further comprises a legacy monitor coupled to the output link and configured to monitor output signals from the legacy device, wherein the logic device reverts usage of the human-computer interface to the legacy device in response to the legacy monitor receiving a predetermined output signal from the legacy device.

7. The system of claim 1, wherein the legacy device is designated for usage of the human-computer interface under default operating conditions.

8. The system of claim 1, wherein during usage of the human-computer interface by the expansion radio, the logic device reverts control of the human-computer interface to the legacy device in response to receiving a predetermined output signal from the legacy device.

9. The system of claim 8, wherein the logic device reverts usage of the human-computer interface to the legacy device by reconnecting the input link to the legacy device and decoupling the expansion radio from the output link.

10. A logic device for facilitating sharing of a human-computer interface of a legacy device between the legacy device and an expansion radio configured to supplement operation of the legacy device, the logic device comprising:
   an input signal path configured to be coupled to an input link for receiving input signals from the human-computer interface, wherein the input signal path is configured to continuously couple the input link to the expansion radio;
   an output signal path configured to be coupled to an output link for supplying output signals to the human-computer interface;
   an input switch configured to selectively couple the input signal path to the legacy device;
   an output switch configured to selectively couple the expansion radio to the output signal path; and
   a switch controller configured to selectively control states of the input and output switches to switch usage of the human-computer interface between the legacy device and the expansion radio in response to control signals from the expansion radio.

11. The logic device of claim 10, wherein the logic device switches usage of the human-computer interface from the legacy device to the expansion radio unit by controlling the input switch to disconnect the legacy device from the input signal path and by controlling the output switch to connect the expansion radio to the output signal path, wherein during usage of the human-computer interface by the expansion radio, the logic device supplies to the output link only those output signals from the legacy device that are designated to override the expansion radio's usage of the human-computer interface.

12. The logic device of claim 10, wherein the logic device switches usage of the human-computer interface from the expansion radio to the legacy device by controlling the input switch to connect the legacy device to the input signal path and by controlling the output switch to disconnect the expansion radio from the output signal path.

13. The logic device of claim 10, wherein the logic device switches usage of the human-computer interface between the expansion radio and the legacy device in response to the expansion radio receiving predetermined signals from the human-computer interface.

14. The logic device of claim 10, further comprising:
   a legacy monitor disposed along the output signal path and configured to monitor output signals from the legacy device and to selectively supply the output signals from the legacy device to the output link, wherein the logic device reverts usage of the human-computer interface to the legacy device in response to the legacy monitor receiving a predetermined output signal from the legacy device.

15. The logic device of claim 10, wherein the logic device is on a circuit card assembly.

16. A method of sharing a human-computer interface of a legacy device between the legacy device and an expansion radio configured to supplement operation of the legacy device, the method comprising:
   monitoring at the expansion radio input signals from the human-computer interface for control codes designating usage of the human-computer interface;
   supplying output signals from the expansion radio to the human-computer interface and preventing input signals from the human-computer interface from reaching the legacy device in response to the expansion radio receiving a control code designating usage of the human-computer interface by the expansion radio; and
   supplying input signals from the human-computer interface to the legacy device and preventing output signals from the expansion radio from reaching the human-computer interface in response to the expansion radio receiving a control code designating usage of the human-computer interface by the legacy device.

17. The method of claim 16, wherein the expansion radio is one of a plurality of expansion radios configured to supplement operation of the legacy device, wherein each of the expansion radios monitors the input signals from the human-computer interface for control codes designating usage of the human-computer interface, wherein each respective expansion radio has a distinct control code for instructing the respective expansion radio to use the human-computer interface.

18. The method of claim 16, wherein the legacy device is designated for usage of the human-computer interface under default operating conditions.

19. The method of claim 16, further comprising:
   reverting control of the human-computer interface from the expansion radio to the legacy device in response to a predetermined output signal from the legacy device.

20. The logic device of claim 10, wherein the input signal path is configured to continuously supply input signals from the human-computer interface to the expansion radio.

21. The logic device of claim 10, wherein during usage of the human-computer interface by the expansion radio, the switch controller controls the input switch to prevent input signals from the human-computer interface from reaching the legacy device in response to the expansion radio receiving a control code designating usage of the human-computer interface by the expansion radio.

22. The system of claim 1, wherein the expansion radio is a software defined radio.

* * * * *

UNITED STATES PATENT AND TRADEMARK OFFICE
CERTIFICATE OF CORRECTION

| | | |
|---|---|---|
| PATENT NO. | : 8,291,123 B2 | Page 1 of 1 |
| APPLICATION NO. | : 11/859826 | |
| DATED | : October 16, 2012 | |
| INVENTOR(S) | : Bruce A. Wight | |

It is certified that error appears in the above-identified patent and that said Letters Patent is hereby corrected as shown below:

Column 9, line 33, Claim 11, replace "expansion radio unit" with -- expansion radio --.

Signed and Sealed this
Twenty-ninth Day of January, 2013

David J. Kappos
*Director of the United States Patent and Trademark Office*